United States Patent
Dwyer

(10) Patent No.: US 6,801,242 B1
(45) Date of Patent: Oct. 5, 2004

(54) FLICKER REDUCTION IN THREE DIMENSIONAL BROADCAST TELEVISION VIEWING

(76) Inventor: Patrick H. Dwyer, 17318 Piper La., Penn Valley, CA (US) 95946

(*) Notice: Subject to any disclaimer, the term of this patent is extended or adjusted under 35 U.S.C. 154(b) by 812 days.

(21) Appl. No.: 09/660,848

(22) Filed: Sep. 13, 2000

(51) Int. Cl.[7] ................................. H04N 9/47
(52) U.S. Cl. ............................. 348/56; 345/8
(58) Field of Search .................. 348/42, 51, 54, 348/55, 56, 43, 362; 345/7, 8, 90; 359/377; 396/235, 247, 251, 254; H04N 9/47

(56) References Cited

U.S. PATENT DOCUMENTS 5,416,510 A * 5/1995 Lipton et al. ............... 348/43
5,522,789 A * 6/1996 Takahashi ................... 359/377
5,717,412 A * 2/1998 Edwards ...................... 345/7
5,945,972 A * 8/1999 Okumura et al. ........... 345/90

* cited by examiner

Primary Examiner—Young Lee

(57) ABSTRACT

An electronic apparatus for, and method of operation of, three dimensional viewing glasses that reduces the perception of flicker by an viewer of three dimensional images on a broadcast television or similar visual display device. The invention can be implemented with a variety of electronic circuit components and different electronic shutter materials. The invention has the primary benefits of: (a) operation with any of the national television broadcast standards in various countries around the world (such as NTSC or PAL); (b) low cost; (c) no viewer adjustment or control required for operation; and (d) useable with a variety of optical transmission materials as shutters, including liquid crystal, ferromagnetic, and other similar materials, in the three dimensional viewer glasses.

4 Claims, 5 Drawing Sheets

FLICKER REDUCTION IN THREE DIMENSIONAL BROADCAST TELEVISION VIEWING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to an apparatus and methods to reduce the perception of "flicker" by a viewer of three dimensional images on a broadcast television or similar visual display device. The invention can be implemented with a variety of electronic components and. optical transmission materials in the three dimensional viewing glasses. The invention has the primary benefits of: (a) operation with any of the national television broadcast standards in various countries around the world (such as NTSC or PAL); (b) low cost; (c) no viewer adjustment or control required for operation; and (d) compatibility with a variety of optical transmission materials as shutters in the three dimensional viewer glasses, including liquid crystal, ferro-magnetic and other similar materials;

2. Description of the Background Art

A wide variety of glasses for viewing three dimensional images have been developed, known and used since the beginning of three dimensional imaging. These special glasses are essentially all based upon the same principal: blocking the view of one eye while the other eye is shown an image that has been focused and converged on the subject of the optical image from approximately the same angle as that of the corresponding typical human eye looking at the same field of view, then quickly reversing the process so that the opposite eye is blocked from the field of view and the first eye is shown the same image recorded from approximately the same angle as that of the corresponding human eye. The average distance between human eyes is approximately 2.5 inches, and this is the distance that is normally used to separate the two recording devices that are used to create the separate stereo images of the subject matter that are shown to each eye in the above-sequence.

Prior to the relatively recent development of liquid crystal and ferromagnetic materials, the two primary methods of blocking the light (or view) into one eye, while the other eye is able to look the subject filed of view, were electro-mechanical shutters and polarized lenses. Electro-mechanical shutters for three dimensional glasses have largely been replaced due to cost, noise and vibration, and related ergonomic factors. Although polarized filters are still in wide use for three dimensional imaging and viewing, they are not generally applicable to the viewing of images from a standard broadcast television or similar video display system that cannot project polarized light.

The advent of liquid crystal and ferromagnetic materials that can vary from clear to black (little or no light transmission) under an applied dc voltage has revolutionized glasses for viewing three dimensional images. These materials are lighter, lower cost, require no moving parts, and generally give superior image quality. It should be noted that the amplitude and polarity of dc voltage applied to these materials differs from one to another and for the sake of clarity and simplicity in the following discussion the dc voltage (either positive or negative) required to turn one of these electronic materials into the "off" or "no light transmission" state will be referred to as the "high" voltage and the voltage required to turn such material to its opposite state will be referred to as the "low" voltage. It should also, be noted that when liquid crystal material is used, an opposite polarity and equal dc voltage must be applied so that the "colored" crystalline material does not accumulate on one side (i.e., against one electrode). Thus, in Applicant's Figures, as in actual operation, an opposite voltage is applied in the corresponding off period for the same electronic shutter.

To Applicant's knowledge, all of the currently available three dimensional viewing glasses produce a perception by the viewer of "flicker" when used with three dimensional images from interlaced video signals used on broadcast television and similar display systems. This flicker is a well known and documented phenomena in the three dimensional imaging industry. Flicker is generally perceived as a very short duration dark flash or blanking of the image in front of the eyes. It is caused by the refresh rate of interlaced video display systems, such as those employed in the various national broadcast television signals, being within the threshold of human perception. In the United States the television video refresh rate is 60 hz, while in Europe, The Peoples's Republic of China, and Japan for instance, the refresh rate is 50 hz. Three dimensional imaging on such broadcast television systems requires that one eye be essentially blocked from viewing the CRT display every other field. This enables the image of an object in the field of view to be shown to each eye from a slightly different angle (corresponding to the natural separation of human eyes), thereby producing a perception of depth in the subject video image. This blocking of one eye and then the other eye to obtain a perception of depth has the consequence of effectively dividing the effective refresh rate to one-half of the 60 or 50 hz interlaced field rate, that is, to 30 or 25 hz. Such a low effective refresh rate for three dimensional imaging on broadcast television (and similar display systems with a low refresh rate) causes the perception of flicker.

At faster refresh rates, such as those used on certain computer systems and in display systems designed for high definition viewing (such as military, scientific, or other "high end" applications) the human eye perceives little or no flicker from the turning on or off of the shutters in three dimensional viewing glasses. The average person sees little or no flicker once the refresh rate approaches 80 or more hz.

As a consequence of the flicker problem inherent in broadcast television due to the low refresh rates, three dimensional viewing on broadcast television has not gained a strong foothold amongst the viewing population. Numerous studies and attempts have been made to eliminate or reduce the flicker effect, including contrast filters, and other devices and methods. However, to applicant's knowledge, none of these efforts has been commercially successful.

Applicant's invention approaches the flicker problem in a novel and original manner that substantially reduces the perception of flicker in three dimensional images viewed on standard broadcast televisions and similar display systems. In addition, applicant's invention can be used with different types of shutter materials such as liquid crystal or ferromagnetic devices. However, as discussed below, Applicant's invention describes the use of a particular liquid crystal material as an electronic shutter that, under certain lighting and viewing conditions, further reduces the perception of flicker.

BRIEF SUMMARY OF THE INVENTION

The present invention consists of an apparatus and methods to reduce the perception of "flicker" by a viewer of three dimensional images on a broadcast television or similar visual display device. This apparatus and method controls the dc voltages applied to the electronic shutter such that for each eye, the amount of light transmission through the electronic shutter is in the range of a "window" defined by the "high" and "low" dc voltages applied to the shutter. The "low" dc voltage is set at a level that permits sufficient light for the viewer to perceive a three dimensional image during the "on" period, and the "high" dc is set to allow a certain amount of light to continue to pass through the electronic shutter so that the viewer does not see the image in front of the respective eye turn completely black or totally opaque. [Note, as discussed below, the actual voltages applied may be reversed if different liquid crystal or other transmission material is employed.]

In addition, the present invention consists of a an electronic circuit that controls the beginning and end of the shutter on and off periods (corresponding to the odd and even fields of interlaced video) in such a manner as to permit the leading and trailing edge of the high and low voltages applied to the shutters in Applicant's invention to be precisely controlled and adjusted to a position where the transmission of light through the shutters is optimized for minimum flicker.

In addition, the present invention consists of a an electronic circuit that controls the rise and fall times of the high and low voltages applied to the electronic shutters in such a manner as to control the current (or charge) applied to the electronic shutters at the leading and trailing edge of each on or off period, thereby enabling a feathering effect that further reduces flicker.

In addition, the present invention consists of variable resistors in series with the liquid crystal shutters so as to slow down the rise and fall times of the current (or charge) in the liquid crystal shutter, thereby permitting additional adjustment of the phase of the light transmission window.

In addition, the present invention consists of the use of liquid crystal shutters that are normally white and opaque with no dc voltage applied and that turn clear as a high dc voltage is applied. The white liquid crystal shutter, under certain lighting, viewing and content conditions can reduce the effect of "flicker" because there is less contrast between the eye seeing white opaque, then clear, as opposed to the eye seeing clear, then black, as with the other liquid crystals used in the industry.

Considered in view of prior designs, Applicant's invention significantly improves the state of the art of glasses (eye sets) for the viewing of three dimensional images on broadcast televisions and similar CRT or display devices.

One object of the invention is to produce three dimensional viewing glasses that reduce the perception of "flicker" when used with a broadcast television or similar CRT or other display device.

Another object of the invention is to produce three dimensional viewing glasses that have an adjustable maximum and minimum drive voltage for the liquid crystal (or other type of) shutters.

Another object of the invention is to produce three dimensional viewing glasses that have an adjustable time delay from the vertical sync signal for the liquid crystal (or other type of) shutters.

Another object of the invention is to produce three dimensional viewing glasses that have an adjustable current rise and fall times for the voltage waveforms that drive the liquid crystal (or other type on shutters.

Another object of the invention is to produce three dimensional viewing glasses that have variable resistors in series with the electronic shutters that affects the current rise. and fall times for the voltage waveforms that drive the liquid crystal (or other type of) shutters.

Another object of the invention is to produce three dimensional viewing glasses that have liquid crystal shutters that are normally opaque white (when no voltage applied) and that turn clear when a voltage is applied.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the invention is embodied in the apparatus generally shown in FIG. 1 through FIG. 5. It will be appreciated that the apparatus may vary as to configuration and as to details of the parts, and that the method may vary as to details and the order of the steps, without departing from the basic concepts as disclosed herein.

A. Waveform Generation

Figure 1:
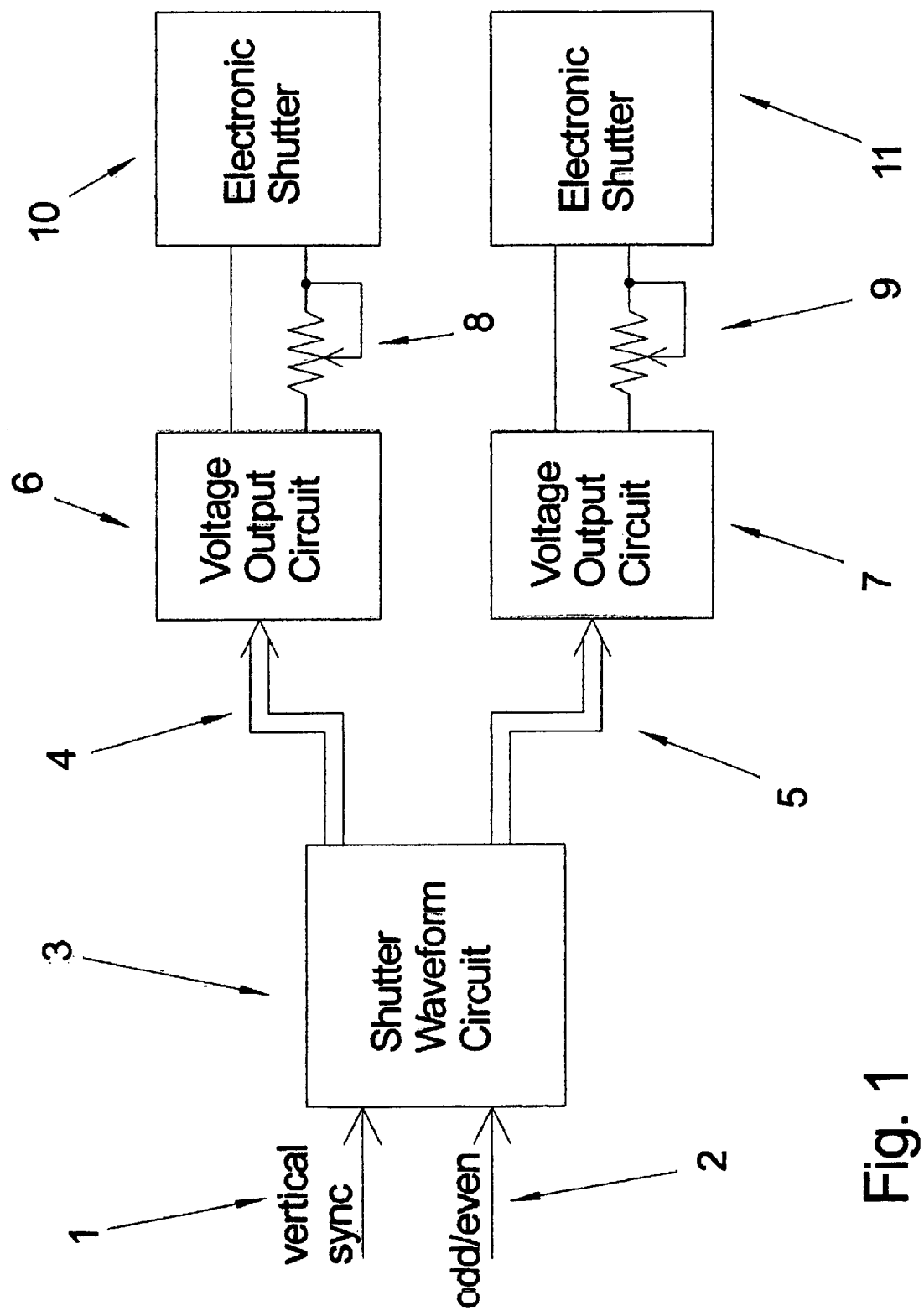
FIG. 1 is a functional block diagram of the shutter waveform circuit to process the vertical sync signal and odd/even field signal (inputs) and then produce the voltage outputs for the electronic (e.g., liquid crystal) shutters in the three dimensional viewing glasses.

Referring to FIG. 1, the vertical sync signal 1 and the odd/even field signal 2 are output signals that can be derived from any standard broadcast television video signal (NTSC or PAL) or similar video display system. These signals can be obtained directly from the typical circuitry inside any broadcast television or they can be extracted from any composite video signal (such as the signal output of a VHS format video tape player) by means of a variety of existing circuits, including the single integrated circuit LM 1881"Video Sync Separator" from National Semiconductor. The video sync signal 1 defines the starting point for the next interlaced "field" and the odd/even signal 2 defines whether the interlaced field will be for the odd lines 1, 3, 5 . . . 525 or the even lines 2, 4, 6 . . . 524 (there are actually 262.5 lines per vertical field in a United States television signal[1]). The shutter waveform generator circuit 3 outputs waveforms 4 and 5 for each odd and even field. Waveforms 4 and 5 can be either actual voltage waveforms or digitized representations thereof. Voltage output circuits 6 and 7 convert the voltage waveforms 4 and 5 into output drive voltages 8 and 9 that, in turn, are connected through variable resistors 12 and 13 (optional) to the electronic shutters 10 and 11, one electronic shutter for each eye in the three dimensional viewing glasses.

[1] Most other countries use 625 lines, but other standards exist.

Depending upon whether an analog or digital approach is taken with the design of the shutter waveform generator 3 and the voltage output circuits 6 and 7 (either type of circuit can be used and the choice will depend largely upon cost and manufacturing variables not relevant to the essence of applicant's invention), waveforms 4 and 5 can be either actual voltages or digitized representations thereof. If an analog approach is used, waveforms 4 and 5 would be analog signals that drive "analog type" voltage output circuits 6 and 7 (such as "driver" type operational amplifiers), and if a digital approach is used, voltage waveforms 4 and 5 would be digitized representations that are converted by means of a "digital to analog converter" in voltage output circuits 6 and 7 into the output voltages necessary for driving the electronic shutters 10 and 11. For example, if a digital "approach" is taken, a digital to analog converter would be used to convert voltage waveforms 4 and 5 into analog form in the voltage output circuits. In turn, voltage output circuits 6 and 7 may or may not use additional analog driver output circuits (e.g., operational amplifiers) to power the electronic shutters 10 and 11. The choice of circuit components would depend upon the electronic load and power consumption (efficiency) of voltage output circuits 6 and 7 and electronic shutters 10 and 11.

The shutter waveform circuit 3 has several functions in Applicants' invention. First, referring to FIGS. 1 thru 3, it generates a "high" voltage 14 (maximum light transmission) and "low" voltage 15 (minimum light transmission) signal for each electronic shutter 10 and 11. The high voltage 14 and low voltage 15 determine the "window" of light transmission that the observer will see through the three dimensional viewing glasses. In other words, by changing the differential voltage between high voltage 14 and low voltage 15, the amount of light that a viewer will see through electronic shutters 10 or 11 is increased for a greater differential voltage and decreased for a lower differential voltage. The complement voltage (i.e., the opposite polarity but equal value dc voltage) is applied to the respective electronic shutter to prevent buildup of the crystal material against one of the electrodes.

The amount of flicker seen by a viewer can be substantially reduced by adjusting the amount of voltage differential between the high voltage 14 and the low voltage 14 so that the light transmission is in the form of a "window" and this window is offset from zero volts dc such that the transmission of light is neither completely blocked nor completely passed. The amount of flicker reduction will increase with the narrowing of the window and the amount of offset from zero volts dc. However, unlike an ordinary contrast filter or a contrast adjustment on a television, the width and the location (dc offset) of the window can be adjusted so as to permit good viewing with contrast, but reduced flicker. This is a result of the eye never seeing a complete change from "all black" to all "light", but instead it perceives more of a brightening and dimming.

The amount of voltage differential voltage can be left adjustable (through the inclusion of an external component such as a potentiometer or switch to shutter waveform circuit 6) or fixed at the time of manufacture. If fixed at the time of manufacture, then the window of light transmission determined by high voltage 14 and low voltage 15 would likely be based upon the results of average viewer response to the amount of "flicker" while watching three dimensional images.

Figure 2:
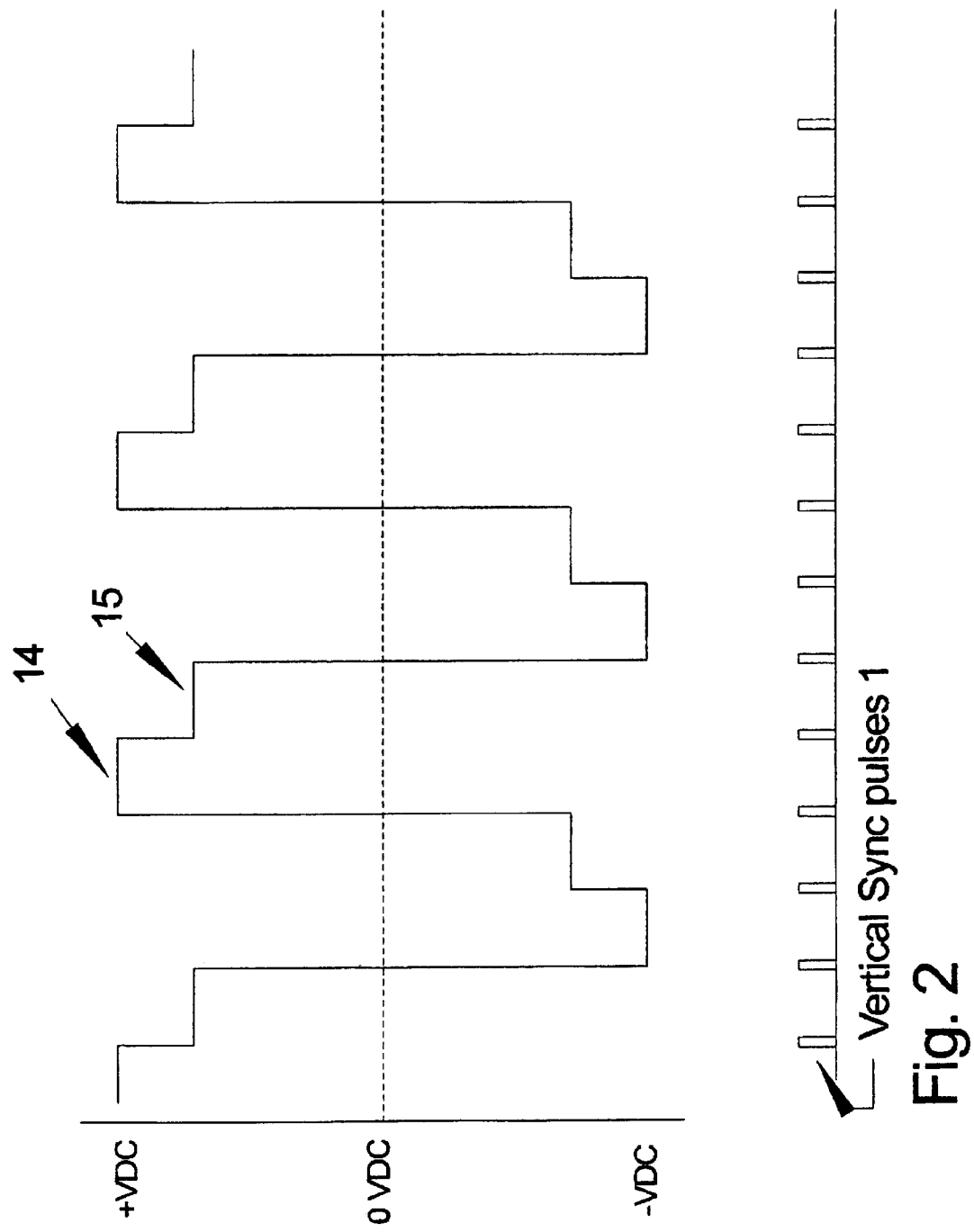
FIG. 2 is a diagram of the voltage waveform sent to the electronic shutters in relationship to the vertical sync signal from a broadcast television signal or similar video display system.
Figure 3:
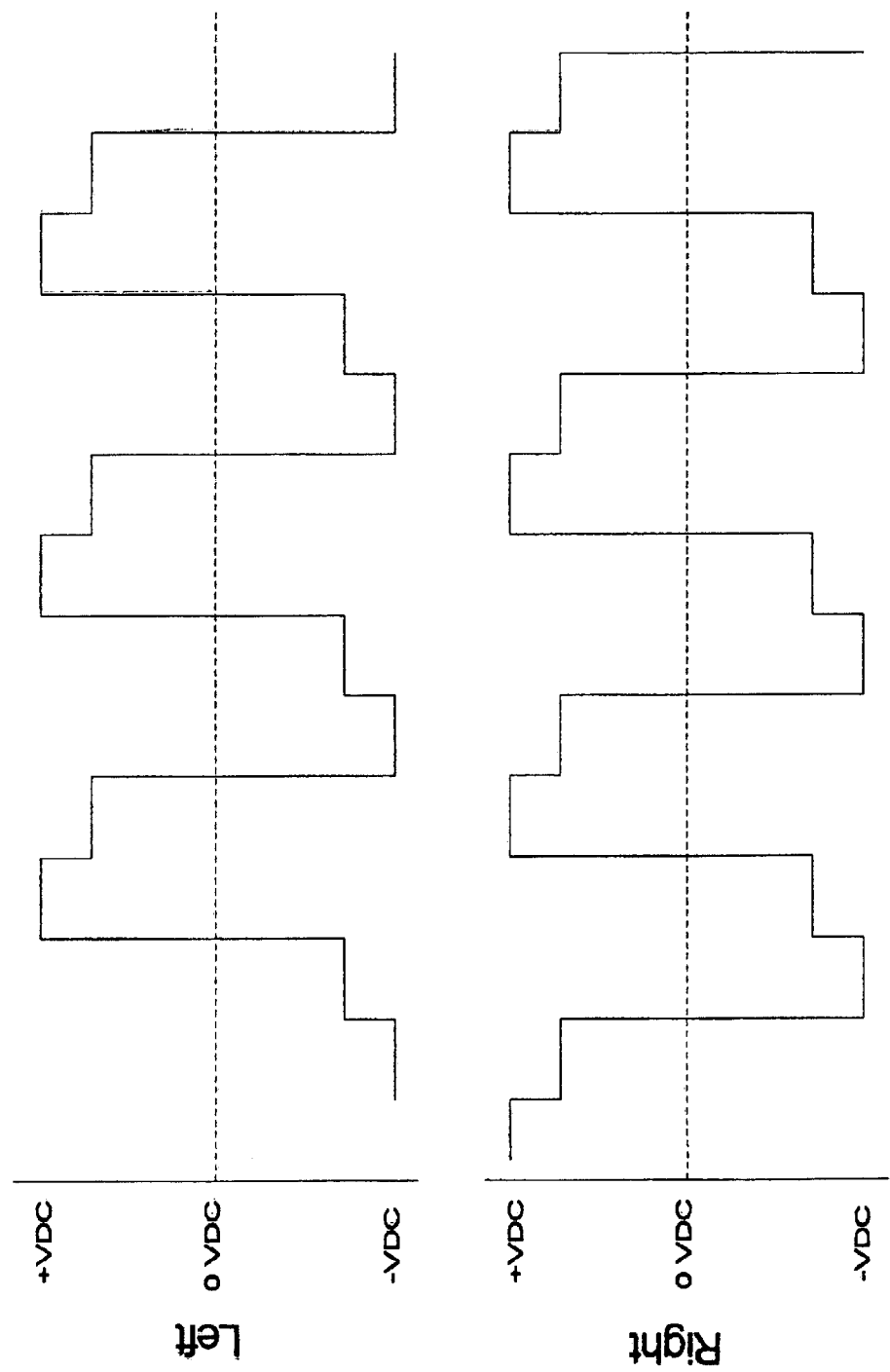
FIG. 3 is a diagram of the voltage waveform sent to the electronic shutters showing a maximum (high) and minimum (low) voltage per respective field.
Figure 5:
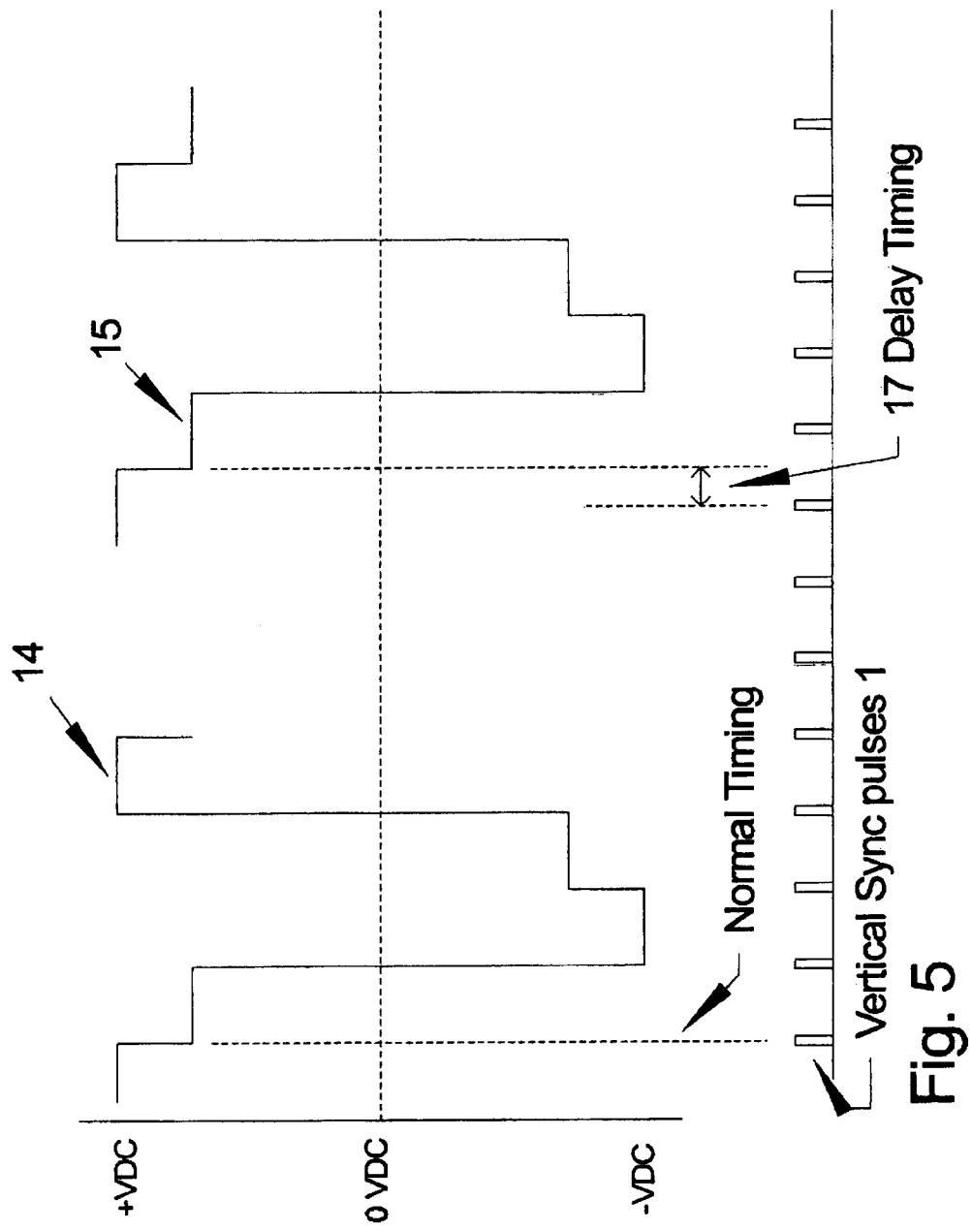
FIG. 5 is a diagram of the waveform sent to the electronic shutters showing the effect of varying the time delay between the vertical sync signal and the voltage sent to the electronic shutters.

Second, referring to FIG. 5, the shutter waveform circuit 3 generates a delay 17 between the vertical sync signal 1 and the beginning of the high voltage 14 and low voltage 15 outputs to the electronic shutters as shown in FIG. 2. The purpose of generating a delay is to ensure that the beginning of each "on" and "off" cycle of the electronic shutters 10 and 11 is in phase with the beginning of the visual image for each respective odd or even field. Like the above described voltage window, the amount of delay between vertical sync signal 1 and either high voltage 14 or low voltage 15 can be left adjustable by the viewer by the addition of a potentiometer (or similar electronic component) to shutter waveform generator 6, or it can be preset at the factory. This delay adjustment is especially important when the variable resistors 12 and 13 are employed and/or the shutter waveform generator creates a slower rise and fall time at the beginning or end of the voltage waveforms 4 and 5.

Figure 4:
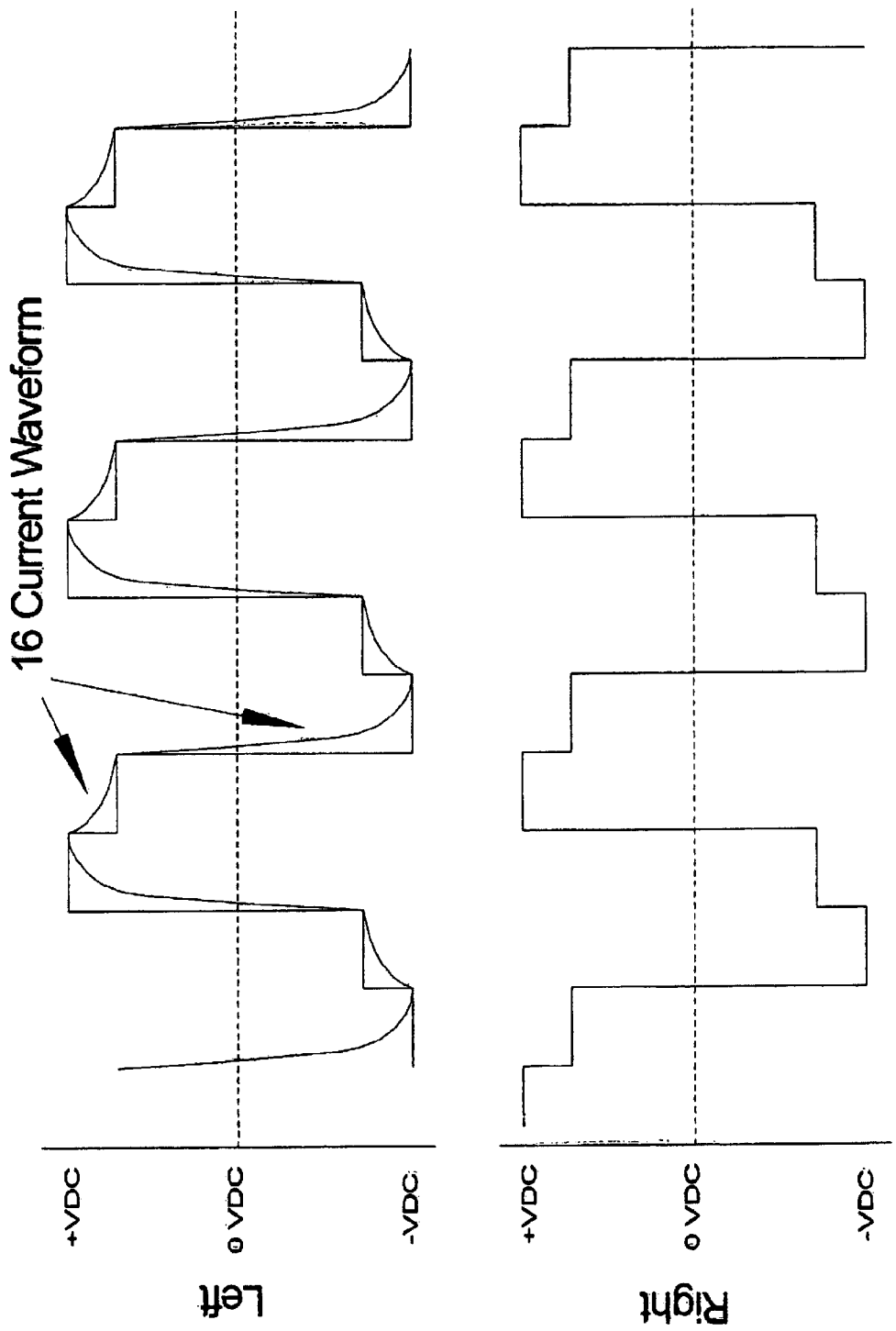
FIG. 4 is a diagram of the current waveform sent to the electronic shutters showing the effect of varying the rise and fall time of the voltage waveform by means of adjusting the shutter waveform circuit.

Third, the waveform generator circuit 3 can generate a sloped or "step" voltage profile at the beginning and/or end of each on or off period for each electronic shutter 10 or 11. This approach can be used in place of, or in conjunction with, variable resistors 12 and 13 to cause a corresponding change in the rise and fall times of the current waveform 16 to electronic shutters 10 and 11 as shown in FIG 4. By adjusting the current waveform, the amount of light transmission can be increased or decreased at the beginning and/or end of each on or off period for the electronic shutters. This effect can be beneficial by "feathering" the change in the amount of light seen by each eye when changing between on and off periods of electronic shutters 10 and 11. This feathering effect can further enhance the reduction of "flicker" that results from the use of a the light "window" created by high voltage 14 and low voltage 15 as described above.

Finally, in the field of three dimensional imaging it is the industry practice to employ electronic shutters 10 or 11 that are normally clear when no voltage is applied and that turn black when a voltage is applied. Thus, the sequence of operation seen by the human eye is clear to black, and black to clear. The effect of flashing a clear, then black image in front of human eyes is a significant contributing factor to the perception of "flicker". Applicant's invention can include the use of an electronic shutter material made of liquid crystal material that is normally white and opaque with no applied voltage, but that turns clear when a negative voltage is applied. This "white" to "clear" method can have a significant reduction on the perception of flicker when viewing with three dimensional glasses. The amount of flicker reduction will depend upon the nature of the three dimensional image content, the type and size of viewing display, and the lighting conditions. Under typical viewing conditions and common three dimensional image content, white to clear liquid crystal electronic shutters can provide additional, significant flicker reduction.

F. Further Summary

The present invention can be varied in many details of the circuit design so as to accommodate either an analog and/or a digital design and a wide variety of circuit components, including without limitation, the use of microprocessors, operational amplifiers, and digital to analog converters. In addition, different sources of input power such as batteries, AC linear or switching power supplies, or DC to DC can be used to provide power to Applicant's invention.

The choice of analog vs. digital components, discrete versus integrated circuits, or even the use of an ASIC or multi-chip module to embody the necessary circuitry, are not important to the principals or method of Applicant's invention. The particular circuit design and components will depend primarily upon such factors as cost, size, and power consumption.

The addition of liquid crystal electronic shutters that are normally opaque white and that turn clear when a negative voltage is applied, in conjunction with the rest of Applicant's invention, can lead to further flicker reduction, depending upon content and viewing conditions.

Although the description above contains many specificities, these should not be construed as limiting the scope of the invention, but merely as providing illustrations of the presently preferred embodiments of this invention.

What is claimed is:

1. An apparatus for controlling the transmission of light through electronic shutters in three dimensional image viewing glasses such as to reduce the perception of flicker by the viewer of the three dimensional image, comprising:

(a) a shutter waveform generator with means for the adjustment of: (i) the maximum and minimum dc voltages applied to said electronic shutters; (ii) the beginning and ending of the on and off state of said electronic shutters with respect to the vertical sync signal and odd/even field signals contained in the various television broadcast signals used worldwide; (iii) the rise and fall time of the beginning and ending of the on and off state of said electronic shutters; and (iv) variable resistors in series with the dc output voltages applied to said electronic shutters; and (c) a voltage output driver circuit that supplies the maximum and minimum dc voltages and required drive current to said electronic shutters as determined by said shutter waveform generator; and (d) a variable resistor in series between the dc voltage output of said voltage output driver circuit and each said electronic shutter.

2. An apparatus as recited in claim 1, wherein said electronic shutters are made of a normally white opaque liquid crystal material that turns clear when a negative dc voltage is applied.

3. A method of controlling the transmission of light through a electronic shutters in a three dimensional image viewing glasses such as to reduce the perception of flicker by the viewer of the three dimensional image comprising the steps of:

(a) adjusting the maximum dc voltage applied to said electronic shutters so as to enable enough light to pass to the eyes of said viewer during the respective on periods for each said eye such that a three dimensional image is perceived by said viewer; and (b) adjusting the minimum dc voltage applied to said electronic shutters so as to enable some amount of light to pass through to said eyes of said viewer during off periods for each said eye of said viewer such that a complete absence of light is not perceived by said viewer; and (c) adjusting the beginning and ending of the on and off state of said electronic shutters with respect to the vertical sync signal and odd/even field signals contained in various television broadcast signals used worldwide; and (d) adjusting the rise and fall times of the beginning and ending of the on and off state of said electronic shutters as produced by a shutter waveform generator; and (e) adjusting the variable resistors in series with the dc output voltages applied to said electronic shutters so as to further adjust the rise and fall times of the beginning and ending of the on and off state of said electronic shutters.

4. An method as recited in claim 3, wherein said electronic shutters are made of a normally white opaque liquid crystal material that turns clear when a negative dc voltage is applied.

* * * * *